US012302944B2

(12) United States Patent
Liu

(10) Patent No.: US 12,302,944 B2
(45) Date of Patent: May 20, 2025

(54) HEAT GENERATING BODY AND ATOMISER

(71) Applicant: SHENZHEN BUDDY TECHNOLOGY DEVELOPMENT CO., LTD., Guangdong (CN)

(72) Inventor: Xiang Liu, Guangdong (CN)

(73) Assignee: SHENZHEN BUDDY TECHNOLOGY DEVELOPMENT CO., LTD., Shenzhen (CN)

( * ) Notice: Subject to any disclaimer, the term of this patent is extended or adjusted under 35 U.S.C. 154(b) by 813 days.

(21) Appl. No.: 17/597,192

(22) PCT Filed: Apr. 1, 2019

(86) PCT No.: PCT/CN2019/080856

§ 371 (c)(1),
(2) Date: Dec. 28, 2021

(87) PCT Pub. No.: WO2020/199093

PCT Pub. Date: Oct. 8, 2020

(65) Prior Publication Data

US 2022/0304384 A1 Sep. 29, 2022

(51) Int. Cl.
*A24F 40/46* (2020.01)
*A24F 7/00* (2006.01)
(Continued)

(52) U.S. Cl.
CPC ................ *A24F 40/46* (2020.01); *A24F 7/00* (2013.01); *A24F 40/10* (2020.01); *A24F 40/42* (2020.01);
(Continued)

(58) Field of Classification Search
None
See application file for complete search history.

(56) References Cited

U.S. PATENT DOCUMENTS

2017/0224015 A1 8/2017 Basil et al.
2018/0184714 A1* 7/2018 Liu ...................... A61M 15/06

FOREIGN PATENT DOCUMENTS

CN 204409588 U 6/2015
CN 105979614 A 9/2016
(Continued)

OTHER PUBLICATIONS

International Search Report and Written Opinion for PCT/CN2019/080856 mailed Dec. 31, 2019.

*Primary Examiner* — Katherine A Will
(74) *Attorney, Agent, or Firm* — Buchalter; Jason W. Croft

(57) ABSTRACT

Disclosed are a novel heat generating body and an atomizer. The novel heat generating body may include a ceramic body, a plurality of micro pores used for liquid infiltration are distributed in the ceramic body, heat generating wires respectively corresponding to two electrodes extend outward from a bottom of the ceramic body, the heat generating wires corresponding to two electrodes are connected by auxiliary heat generating wires arranged on an outer surface of the ceramic body, the auxiliary heat generating wires are distributed on outer surfaces of a bottom and a side wall of the ceramic body, and the auxiliary heat generating wires are metal wires embedded in the outer surfaces of the bottom and the side wall of the ceramic body, or the auxiliary heat generating wires are metal powder/metal wires printed on the outer surfaces of the bottom and the side wall of the ceramic body.

7 Claims, 3 Drawing Sheets

(51) Int. Cl.

*A24F 40/10* (2020.01)
*A24F 40/42* (2020.01)
*A24F 40/44* (2020.01)
*H05B 3/16* (2006.01)

(52) U.S. Cl.

CPC ............... *A24F 40/44* (2020.01); *H05B 3/16* (2013.01); *H05B 2203/003* (2013.01); *H05B 2203/013* (2013.01); *H05B 2203/016* (2013.01)

(56) References Cited

FOREIGN PATENT DOCUMENTS

| | | | |
|---|---|---|---|
| CN | 205757186 | U | 12/2016 |
| CN | 206238429 | U | 6/2017 |
| CN | 208192127 | U | 12/2018 |
| CN | 208318253 | U | 1/2019 |

* cited by examiner

HEAT GENERATING BODY AND ATOMISER

TECHNICAL FIELD

The present disclosure relates to the field of atomizers, and more particularly, to a novel heat generating body with a cotton-free atomizing structure and an atomiser.

BACKGROUND

Currently, there are generally two methods for heating liquid in an atomiser. In one method, a cotton-wrapped structure is used, the liquid is led to a heat generating body through cotton, and a cotton-wrapped heating method is used for atomization, but this method has defects. First, wrapped cotton is easy to cause liquid leakage, so that the atomiser may fail, or people may inhale the leaked liquid by mistake. Second, during atomization, it is difficult to balance a temperature of heating wires and an amount of liquid atomization, which is easy to scorch the wrapped cotton. Meanwhile, due to uneven atomization, it is difficult to achieve a good release effect and a smell and/or taste may be affected. To improve the smell and/or taste and avoid inhaling the liquid by mistake, some heat generating bodies have started to appear in the market. The advantage of the heat generating bodies is that the liquid can infiltrate into micro pores of the heat generating bodies evenly without the wrapped cotton, and heated evenly. However, at present, the heat generating body in the market still has defects. The heating wires are only printed at a bottom of the heat generating body, so that an overall heating effect is poor, and the liquid is easy to be directly inhaled, while smoke cannot come out, which is mainly because of insufficient heating.

SUMMARY

Technical Problems

Therefore, a novel heat generating body and an atomiser are needed, which can improve a smell and/or taste, increase a reduction degree of liquid, and solve a problem of inhaling the liquid by mistake, and simplify a structure by omitting wrapped cotton.

Solution to Problems

Technical Schemes

The technical problems to be solved by the present disclosure is to provide a novel heat generating body and an atomiser, which can improve a smell and/or taste, increase a reduction degree of liquid, and solve a problem of inhaling the liquid by mistake, and simplify a structure by omitting wrapped cotton. Therefore, in a first aspect of the present disclosure, a novel heat generating body is provided, which includes a ceramic body, where a plurality of micro pores used for liquid infiltration are distributed in the ceramic body, heat generating wires respectively corresponding to two electrodes extend outward from a bottom of the ceramic body, the heat generating wires corresponding to two electrodes are connected by auxiliary heat generating wires arranged on an outer surface of the ceramic body, the auxiliary heat generating wires are distributed on outer surfaces of a bottom and a side wall of the ceramic body, and the auxiliary heat generating wires are metal wires embedded in the outer surfaces of the bottom and the side wall of the ceramic body, or the auxiliary heat generating wires are metal powder/metal wires printed on the outer surfaces of the bottom and the side wall of the ceramic body.

In an example embodiment, two auxiliary heat generating wires are provided, both of which use roots of the heat generating wires corresponding to the two electrodes as a starting point and an ending point respectively, and are evenly distributed on the outer surfaces of the bottom and the side wall of the ceramic body in an S shape.

In an example embodiment, the ceramic body is a runway-type circular cylinder.

In an example embodiment, the auxiliary heat generating wires are evenly distributed on outer surfaces of two straight side walls and a bottom of the runway-type circular cylinder.

In an example embodiment, two heat generating wires corresponding to two electrodes are provided, and one electrode corresponds to one heat generating wire.

In an example embodiment, more than three auxiliary heat generating wires are provided, all of which use roots of the heat generating wires corresponding to two electrodes as a starting point and an ending point respectively, and are evenly distributed on the outer surfaces of the bottom and the side wall of the ceramic body in an S shape.

In an example embodiment, the ceramic body is cup-shaped, and an upper surface is provided with a groove for storing the liquid.

In an example embodiment, the ceramic body has a maximum diameter of 6.6 mm to 11.6 mm; and the ceramic body has a height of 3.5 mm to 5.5 mm.

In a second aspect of the present disclosure, an atomiser is provided, which has the novel heat generating body according to any one of the items above, further includes a suction nozzle and an liquid storage assembly, and further includes other parts of an atomizing assembly except the novel heat generating body, where the suction nozzle and the atomizing assembly are respectively arranged at two ends of the liquid storage assembly, the liquid storage assembly includes an outer wall and an liquid storage pipe arranged inside the outer wall, the atomizing assembly further includes a base, the base is hermetically butted with the outer wall, an upper end of the ceramic body is hermetically communicated with an inner wall of the liquid storage pipe, a cavity between the outer wall and the liquid storage pipe forms a smoke passage of the liquid storage assembly, a gap between an outer surface of the ceramic body and the base forms a smoke passage of the atomizing assembly, and the smoke passage of the liquid storage assembly and the smoke passage of the atomizing assembly are communicated with the suction nozzle.

In an example embodiment, the suction nozzle is a metal suction nozzle, a glass suction nozzle or a ceramic suction nozzle.

Beneficial Effects of the Disclosure

Beneficial Effects

The implementation of the present disclosure can achieve at least the following beneficial effects: the auxiliary heat generating wires have an embedded structure, which is more stable and coherent than a current printing structure, the auxiliary heat generating wires are distributed not only on the outer surface of the bottom of the ceramic body, but also on the outer surface of the side wall of the ceramic body, which is equivalent to establishing a 3D heating kettle, and compared with current single-face heating, the novel heat generating body has higher efficiency, achieves more sufficient heating, and simplifies a structure and facilitates mounting by omitting wrapped cotton. The structure of the embedded metal wires makes the 3D heating structure more stable, and it is not easy to produce a breakpoint. The two supplement each other. If the metal powder/metal wires are printed on the outer surface of the ceramic body, then there are also the advantages of convenient printing and simplified production process. The two may be selected according to actual needs, and may both achieve the objective of disclosure of the patent. The auxiliary heat generating wires are only embedded in the outer surface of the ceramic body instead of penetrating through an interior of the ceramic body, so that smoke comes out more easily, the pores are not easy to be blocked, the smell and/or taste is better, and the reduction degree of the liquid is increased. In at least one embodiment, two auxiliary heat generating wires are provided, both of which use the roots of the heat generating wires corresponding to two electrodes as the starting point and the ending point respectively, and are evenly distributed on the outer surfaces of the bottom and the side wall of the ceramic body in an S shape. A heating effect is better and more uniform. The ceramic body is the runway-type circular cylinder, so that two straight side walls of the runway-type circular cylinder leave a space for the smoke passage of the atomiser. The auxiliary heat generating wires are evenly distributed on the outer surfaces of the two straight side walls and the bottom of the runway-type circular cylinder, and form a space with three faces heated centralizedly. Flush embedding is easier, and three-face heating has high efficiency, so that an atomizing effect is good. More than three auxiliary heat generating wires may also be provided, which is adjusted according to a size of the ceramic body. Within a certain range, the more the auxiliary heat generating wires, the higher the heating efficiency, and the more sufficient the heating. The ceramic body is cup-shaped, and the upper surface is provided with the groove for storing the liquid, so that the liquid can more easily infiltrate into the heat generating wires and the auxiliary heat generating wires. Therefore, initial heating efficiency is higher, and the atomizing effect is better. An outer layer of the whole atomiser serves as the smoke passage, and an inner layer of the atomiser serves as an liquid passage, which fundamentally implements separation of the liquid and smoke, has a neat structure, and simplifies a plurality of sealing members. The suction nozzle is the metal suction nozzle, the glass suction nozzle or the ceramic suction nozzle, and various schemes are provided, thereby being convenient for those of ordinary skill in the art to select and implement according to actual needs.

DETAILED DESCRIPTION

Embodiments of the Present Disclosure

Figure 1:
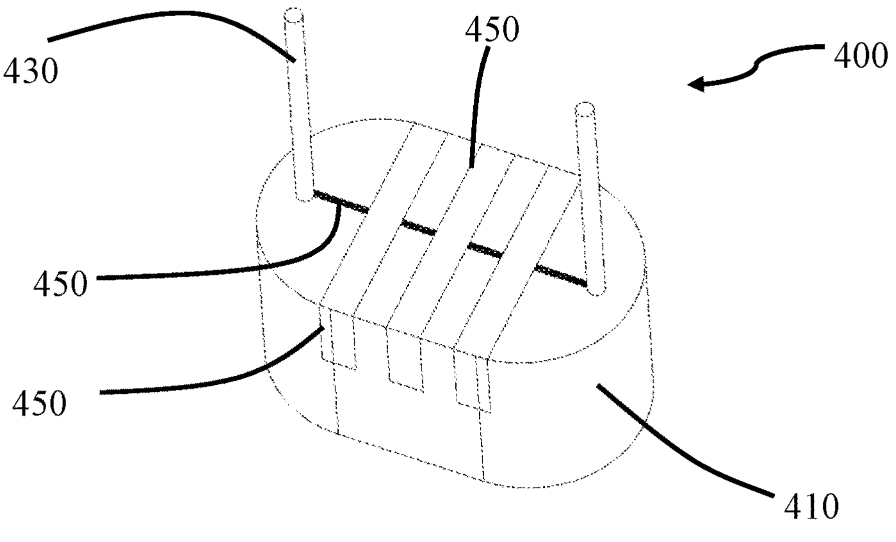
FIG. 1 is a stereoscopic structural diagram of a ceramic heat generating body provided by the present disclosure.
Figure 2:
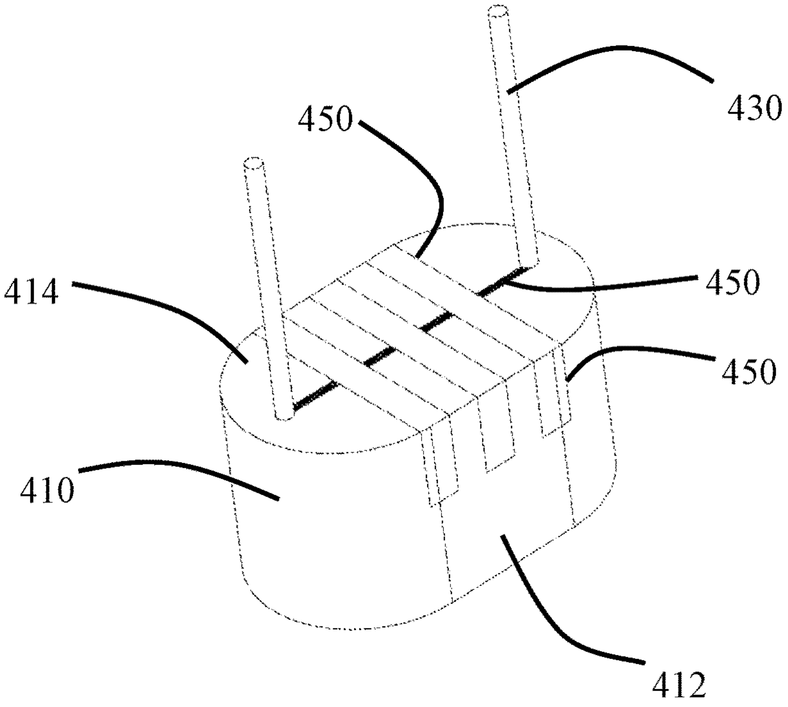
FIG. 2 is a stereoscopic structural diagram of the ceramic heat generating body provided by the present disclosure.
Figure 3:
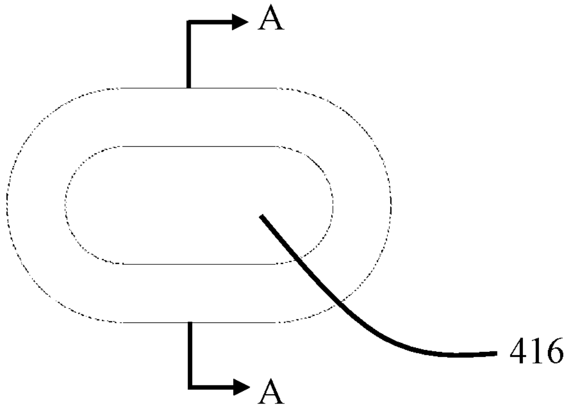
FIG. 3 is a top view of the ceramic heat generating body shown in FIG. 1.
Figure 4:
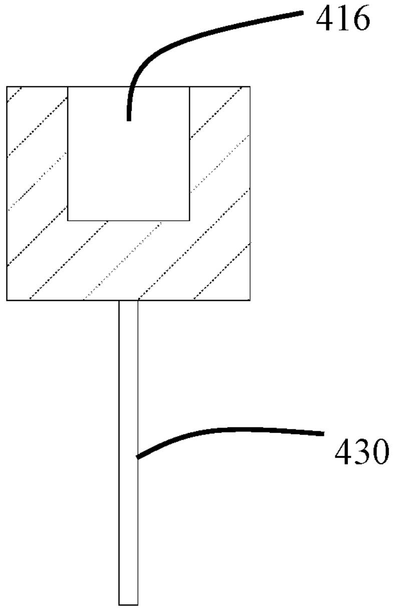
FIG. 4 is a sectional view of an A-A direction of the ceramic heat generating body shown in FIG. 3.

Referring to FIG. 1 to FIG. 4, a first embodiment of the present disclosure provides a novel heat generating body 400, which includes: a ceramic body 410, heat generating wires 430 and auxiliary heat generating wires 450. A plurality of micro pores used for liquid infiltration are distributed in the ceramic body 410. The heat generating wires 430 extend outward from a bottom of the ceramic body 410, and respectively correspond to two electrodes. In the embodiment, the heat generating wire 430 and the auxiliary heat generating wire 450 are both metal heat generating wires. The auxiliary heat generating wires 450 are embedded in an outer surface of the ceramic body 410 to electrically connect the heat generating wires 430 corresponding to two electrodes. More specifically, in the embodiment, two auxiliary heat generating wires 450 are provided, both of which use roots of the heat generating wires corresponding to two electrodes as a starting point and an ending point respectively, and are evenly distributed on outer surfaces of a bottom and a side wall of the ceramic body 410 in an S shape. It should be understood that, in other embodiments, the auxiliary heat generating wires 450 may also be metal powder/metal wires printed on the outer surfaces of the bottom and the side wall of the ceramic body. In the embodiment, the metal powder or the metal wires are made of a base metal, which refers other metals rather than precious metals such as gold, silver and platinum.

In the embodiment, the ceramic body 410 is a runway-type circular cylinder, and an upper surface is provided with a groove 416 for storing liquid, thus forming a cup-shaped body. In the embodiment, the auxiliary heat generating wires 450 are evenly distributed on outer surfaces of two straight side walls 412 and a bottom 414 of the runway-type circular cylinder. Two heat generating wires corresponding to two electrodes are provided, and one electrode corresponds to one heat generating wire.

It should be understood that, in other embodiments, a shape of the ceramic body 410 may not be a runway-type circle, and the shape of the ceramic body may be changed with a change of an inner structure of an atomiser. There are not necessarily two heat generating wires corresponding to two electrodes, and there is not necessarily one-to-one correspondence. Four heat generating wires may also be provided, and every two heat generating wires correspond to two electrodes respectively. There are not necessarily two auxiliary heat generating wires. Only one or more than three auxiliary heat generating wires may also be provided, all of which use roots of the heat generating wires corresponding to two electrodes as a starting point and an ending point respectively, and are evenly distributed on the outer surfaces of the bottom and the side wall of the ceramic body in an S shape. In other embodiments, the ceramic body 410 is not necessarily a cup-shaped ceramic, but may also be a complete cylinder.

In one embodiment, the ceramic body 410 has a maximum diameter of 6.6 mm to 11.6 mm; and the ceramic body 410 has a height of 3.5 mm to 5.5 mm. The maximum diameter indicates that, for example, in the embodiment, a cross section of the ceramic body 410 is a runway-type circle, and a longest linear distance in the runway-type circular plane is 6.6 mm to 11.6 mm.

Figure 5:
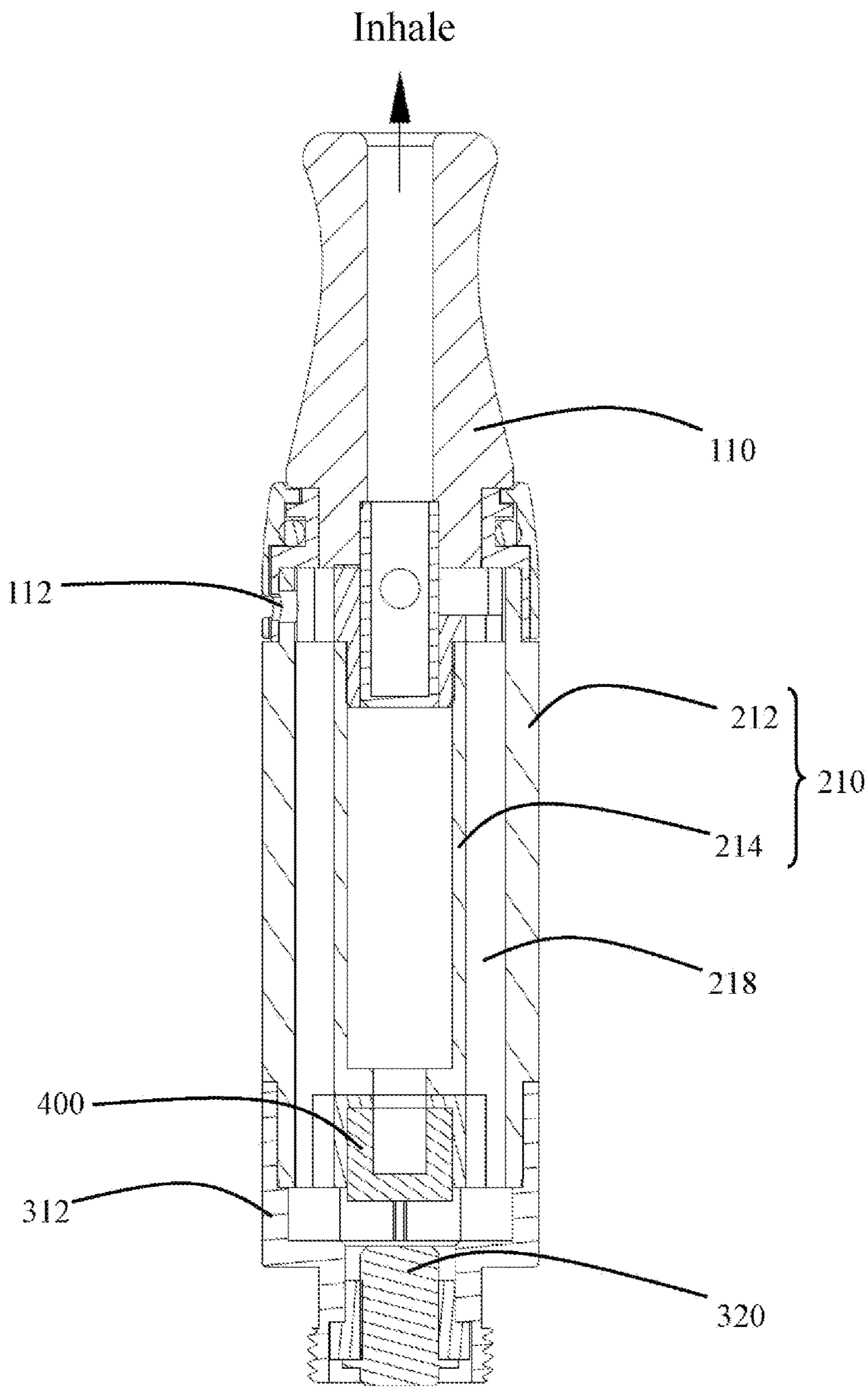
FIG. 5 is a cross-sectional view of an atomiser provided by the present disclosure.

Referring to FIG. 5, the present disclosure further provides an atomiser, which has the novel heat generating body 400, further includes a suction nozzle 110 and a liquid storage assembly 210, and further includes other parts of an atomizing assembly except the novel heat generating body 400. The suction nozzle 110 and the atomizing assembly are respectively arranged at two ends of the liquid storage assembly 210, the liquid storage assembly 210 includes an outer wall 212 and an liquid storage pipe 214 arranged inside the outer wall 212, the atomizing assembly further includes a base 312, the base 312 is hermetically butted with the outer wall 212, and an upper end of the ceramic body 410 is hermetically communicated with an inner wall of the liquid storage pipe 214. A cavity between the outer wall 212 and the liquid storage pipe 214 forms a smoke passage 218 of the liquid storage assembly, a gap between an outer surface of the ceramic body 410 and the base 312 forms a smoke passage of the atomizing assembly, and the smoke passage of the liquid storage assembly and the smoke passage of the atomizing assembly are communicated with the suction nozzle. The suction nozzle 110 is a metal suction nozzle, a glass suction nozzle or a ceramic suction nozzle. An inlet 112 is directly communicated with the smoke passage of the liquid storage assembly 210. The heat generating wires 430 are connected to an electrode post 320 to be electrified.

The embodiments cannot be understood as limiting the scope of the patent of the present disclosure. It should be noted that those of ordinary skills in the art may further make several modifications and improvements without departing from the concept of the present disclosure, such as combining different features in various embodiments, and these modifications and improvements.

What is claimed is:

1. A novel heat generating body, comprising: a ceramic body, wherein a plurality of micro pores used for liquid infiltration are distributed in the ceramic body, heat generating wires respectively corresponding to two electrodes extend outward from a bottom of the ceramic body, the heat generating wires corresponding to two electrodes are connected by auxiliary heat generating wires arranged on an outer surface of the ceramic body, the auxiliary heat generating wires are distributed on outer surfaces of a bottom and a side wall of the ceramic body, and the auxiliary heat generating wires are metal wires embedded in the outer surfaces of the bottom and the side wall of the ceramic body, or the auxiliary heat generating wires are metal powder/metal wires printed on the outer surfaces of the bottom and the side wall of the ceramic body;

wherein the ceramic body is cup-shaped, and an upper surface is provided with a groove for storing the liquid.

2. The novel heat generating body of claim 1, wherein two auxiliary heat generating wires are provided, both of which use roots of the heat generating wires corresponding to two electrodes as a starting point and an ending point respectively.

3. The novel heat generating body of claim 2, wherein two heat generating wires corresponding to two electrodes are provided, and one electrode corresponds to one heat generating wire.

4. The novel heat generating body of claim 1, wherein more than three auxiliary heat generating wires are provided, all of which use roots of the heat generating wires corresponding to two electrodes as a starting point and an ending point respectively.

5. The novel heat generating body of claim 1, wherein the ceramic body has a maximum diameter of 6.6 mm to 11.6 mm; and the ceramic body has a height of 3.5 mm to 5.5 mm.

6. An atomiser, comprising a suction nozzle and a liquid storage assembly and an atomizing assembly, the atomizing having the novel heat generating body of claim 1, wherein the suction nozzle and the atomizing assembly are respectively arranged at two ends of the liquid storage assembly, the liquid storage assembly comprises an outer wall and an liquid storage pipe arranged inside the outer wall, the atomizing assembly further comprises a base, the base is hermetically butted with the outer wall, an upper end of the ceramic body is hermetically communicated with an inner wall of the liquid storage pipe, a cavity between the outer wall and the liquid storage pipe forms a smoke passage of the liquid storage assembly, a gap between an outer surface of the ceramic body and the base forms a smoke passage of the atomizing assembly, and the smoke passage of the liquid storage assembly and the smoke passage of the atomizing assembly are communicated with the suction nozzle.

7. The atomiser of claim 6, wherein the suction nozzle is a metal suction nozzle, a glass suction nozzle or a ceramic suction nozzle.

* * * * *